Oct. 15, 1968        R. KONTRIMAS ET AL        3,406,366
ELECTRICAL TEMPERATURE SENSOR DEVICE
Filed Jan. 13, 1966                 2 Sheets-Sheet 1

INVENTORS
RICHARD KONTRIMAS
ROBERT J. KROHL
EDWARD S. WAJDA
BY Wolmar J. Stoffel
ATTORNEY United States Patent Office 3,406,366
Patented Oct. 15, 1968

3,406,366
ELECTRICAL TEMPERATURE SENSOR DEVICE
Richard Kontrimas, Poughkeepsie, Robert J. Krohl, Schenectady, and Edward S. Wajda, Poughkeepsie, N.Y., assignors to International Business Machines Corporation, Armonk, N.Y., a corporation of New York
Filed Jan. 13, 1966, Ser. No. 521,487
8 Claims. (Cl. 338—25)

ABSTRACT OF THE DISCLOSURE

The electrical sensor has an elongated resistance element of monocrystalline semiconductor material including a P or N type impurity. The resistance element is inlaid in a base of rigid insulating material preferably having a coefficient of expansion substantially matching the material of the resistance element. The resistance element is insulated by at least a layer of insulating material in intimate contact with the element.

---

This invention relates to electrical temperature transducers, and more particularly to an electrical temperature sensor device employing a semiconductor resistance element mounted on an insulating substrate.

Electrical temperature indicating and sensing apparatus, in general, depend on the phenomena that the electrical resistance of selected materials vary with temperature. The apparatus measures or detects the electrical resistance of a temperature sensor exposed to the temperature environment to be tested or measured, and correlates this resistance with a suitable temperature scale or preselected temperature level. Generally, the known temperature sensors employ metal resistive elements having suitable temperature coefficients of resistivity. However, metal resistive elements in sensors have not been entirely satisfactory in regard to stability, sensitivity, speed of response, dependability and durability. Further, metal resistive elements temperature sensors cannot be readily adapted for use in different temperature ranges since the temperature coefficient of the resistive element cannot be adjusted during manufacture.

Temperature sensors embodying semiconductor resistive elements are known. However, the known semiconductor resistance elements are insulated on a base or supported by P-N junctions which exert an electrical leakage effect, particularly at higher temperatures, which impose limits on the useful temperature range and sensitivity characteristics.

It is an object of the present invention to provide a new temperature sensor having superior operating characteristics.

Yet another object of this invention is to provide a new semiconductor temperature sensor having a high upper operating temperature limit for a given semiconductor resistance element having a preselected temperature coefficient of resistance.

Still another object of this invention is to provide a new semiconductor temperature sensor having a large useful operating range.

Still another object of this invention is to provide a new temperature sensor having a semiconductor resistance element with a temperature coefficient of resistance that is substantially constant over the entire useful operating range.

Still another object of this invention is to provide a semiconductor temperature sensor in which the temperature coefficient of resistance can be precisely controlled during manufacture.

Another object of this invention is to provide a new semiconductor temperature sensor having an inlaid resistance element.

Still another object of this invention is to provide a temperature sensor that will withstand vibration, shock, etc.

Another object of this invention is to provide a new semiconductor temperature sensor that is rugged and dependable in use.

Yet another object of this invention is to provide a sensor that is very thin, thereby enabling same to sense minor temperature variations, but which possesses high mechanical strength.

Still another object of this invention is to provide a very thin temperature sensor having a small heat capacity, thereby making possible a very fast response time.

Another object of this invention is to provide a new method of producing a semiconductor temperature sensor having an inlaid resistance element.

Yet another object of this invention is to provide a new method for producing a semiconductor temperature sensor, wherein the temperature coefficient of resistance can be adjusted to a preselected value.

The new electrical temperature transducer of the invention has a base of rigid insulating material. A unitary resistance element of semiconductor material having spaced electrical terminal portions is united to the base. Preferably, the semiconductor material has a monocrystalline form. The degree of dopant or active impurity used in the semiconductor material will control the sensitivity of the transducer and also the magnitude of the useful operating temperature range.

In the new method of the invention for producing an electrical temperature transducer having an inlaid semiconductor resistor element, an etch mask of oxide, nitride, carbide, etc., having the desired plan shape of the resistance element, is formed on the surface of a semiconductor wafer using conventional photolithographic process. The wafer is then etched to thereby form an embossed resistance element on same. A layer of insulating material is then formed over the embossed resistance element, and the wafer material is removed to the planar interface of the wafer and layer of insulating material.

The term "semiconductor material" as utilized herein is considered generic to germanium, silicon, germanium silicon alloys, silicon carbide and compounds such as indium-antimonide, gallium-arsenide, gallium antimonide, indium arsenide, and the like.

The term "active impurity" is used to denote those impurities which effect the electrical characteristics of the semiconductor materials as distinguished from other impurities which have no appreciable effect on these characteristics. Active impurities are ordinarily classified as donor impurities, such as phosphorus, arsenic, and antimony, or acceptor impurities, such as boron, aluminum, gallium and indium.

The present invention involves, to a considerable extent, the discovery that a semiconductor material mounted on an insulating material, rather than being insulated from a base with a P-N junction, provides in a temperature sensor a higher upper operative temperature limit. The resultant sensor having an inlaid resistance element is rugged and dependable and capable of withstanding vibration and shock.

The foregoing and other objects, features and advantages of the invention will be apparent from the following more particular description of preferred embodiments of the invention, as illustrated in the accompanying drawings. It is to be expressly understood, however, that the description is for the purpose of illustration only and that the true spirit and scope of the invention is to be defined by the accompanying claims.

Figure 1A:
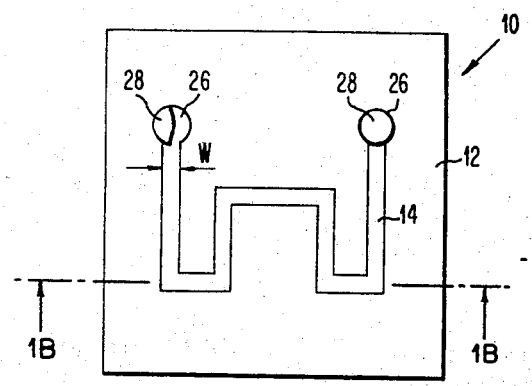
FIG. 1A is a top plan view of a preferred specific embodiment of the new electrical temperature transducer of the invention.
Figure 1B:
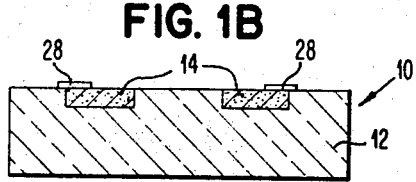
FIG. 1B is a cross sectional view taken on line 1B of FIG. 1A.

Referring now to the drawings, there is depicted in FIGS. 1A and 1B electrical temperature transducer 10, a preferred specific embodiment of the invention. The sensor devices are depicted in greatly enlarged scales. The proportions are depicted with the thickness dimension in a larger scale than the width dimension in the interests of clarity of illustration. The transducer or sensor 10 has a base 12 of rigid insulating material. The material of base 12 can be any suitable insulating material, such as glass or the like. In sensors adapted for use in relatively low temperature ranges plastics, such as polytetrafluoroethylene or the like, can be used. The preferred material for base 12 is glass having a coefficient of expansion substantially matching the material of the coefficient of expansion of the semiconductor resistance element 14. The material of base 12 must be capable of bonding to element 14. Suitable glasses for use in base 12 are IBM 393 Glass, a lime-alumina-silicate glass with a composition of 22% $Al_2O_3$, 11% CaO, and 67% $SiO_2$, and an IBM 309 Glass composed of 16% $Al_2O_3$, 7% CaO, and 77% $SiO_2$. A unitary elongated resistance element 14 of monocrystalline semiconductor material provided with terminal portions 26 is mounted in base 12. More specifically, resistance element 14 is inlaid in base 12 so that the top surface of the element and the top surface of base 12 lie in the same plane. The semiconductor material can be silicon, germanium, gallium arsenide, or the like. The semiconductor element 14 is doped with an active impurity of either the N or P type. The degree of concentration of the artive impurity influences both the temperature range and the sensitivity of the resultant temperature sensor. As the curves 71, 72 and 74 in FIG. 5 indicate, the electric resistance of semiconductors increases substantially linearly with temperature. However, the curves reach a maximum at some point, which maximum defines the upper limit of the useful working range. If a sensor is utilized beyond the maximum, two temperatures will give a similar reading which is unacceptable. When the doping concentration of the active impurity is increased in the semiconductor resistor element 14, the useful range is increased, that is the maximum on the curve occurs at a higher temperature. However, increasing the doping concentration of the active impurity decreases the sensitivity of the sensor device. Thus, by selecting the proper doping level of the semiconductor resistance element it is possible to produce a temperature sensor having a specified sensitivity or operating range. The selection of a doping level is in effect a compromise between useful range and sensitivity. In the practice of our invention the preferred doping concentration of the resistance element is in the range of $5 \times 10^{14}$ to $5 \times 10^{17}$ atoms/cc. Metal contact terminals 28 are secured over terminal portions 26.

Figure 2A:
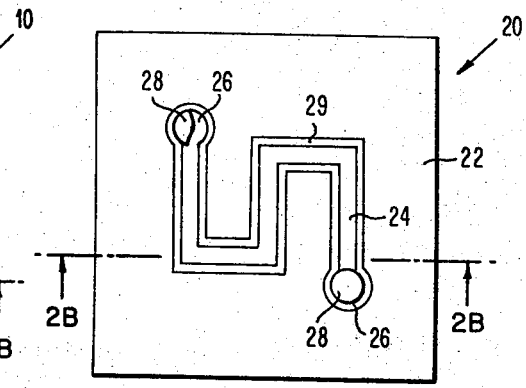
FIG. 2A is a top plan view of another preferred specific embodiment of the electrical temperature transducer of the invention.
Figure 2B:
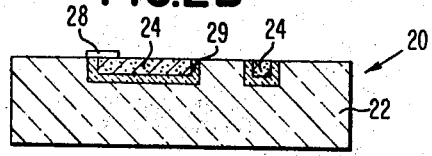
FIG. 2B is a cross sectional view taken on line 2B of FIG. 2A.

Referring now to FIGS. 2A and 2B, there is depicted another temperature sensor embodiment 20 of the invention. The temperature sensor 20 has a base 22 of polycrystalline material, such as polycrystalline silicon. The base 22, however, can be made of any suitable material such as glass, heat resistant plastic, etc. A unitary elongated resistance element 24 of monocrystalline semiconductor material is inlaid in base 22 as most clearly illustrated in FIG. 2B. The semiconductor material of resistance element 22 is preferably doped with an active impurity material in the same manner described relative to sensor embodiment 10. Terminal portions 26 are provided on opposite ends of resistor 24. These terminal portions 26 are provided with metal terminals 28 to insure positive electrical contact. Disposed about electrical resistance element 24 is an insulating coating 29 of $SiO_2$. The coating 29 can be of any suitable insulating material, such as oxides, nitride, carbide, etc., in any suitable thickness. The preferred material of coating 29 is $SiO_2$. The resistance element 24 of temperature sensor 20, and also temperature sensor 10, can be of any suitable shape and length, which shape and length are dictated by design considerations. The base 22 of temperature sensor 20 is typically 70 x 70 mils, with a thickness of 8 mils. The overall length of the silicon semiconductor element 24 is approximately 150 mils. The semiconductor element 24 is typically 4 mils in width and one mil in depth. The thickness of $SiO_2$ layer 29 is preferably in the range of 3,000 to 12,000 angstroms.

Figure 3A:
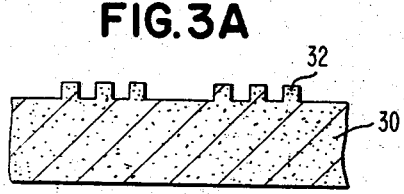
FIGS. 3A, 3B and 3C illustrate a sequence of process steps used to produce a temperature transducer of the invention in accordance with the method of the invention.
Figure 3B:
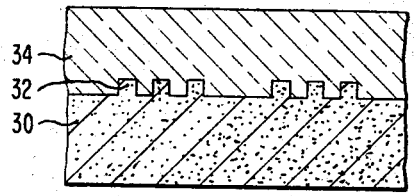
Figure 3C:
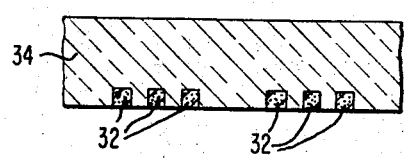

Referring now to FIGS. 3A through 3C, there is depicted a preferred embodiment of the method for making temperature transducers having a monocrystalline semiconductor resistance element inlaid in a base. In FIG. 3A is shown a semiconductor wafer 30 having formed on the top surface the desired shape of the resistance element. Wafer 30 is a monocrystalline semiconductor wafer doped with an active impurity. The resistance element 32 is formed by conventional photo resist and etch techniques. To form the resistance element 32 a layer of oxide is formed on the surface of the wafer and a photosensitive emulsion coating applied thereon. The photosensitive coating is exposed to form thereon the plan shape of the resistance element. The photosensitive coating is then developed and the areas other than over the resistance element removed. The wafer is then subjected to a suitable etchant to remove the oxide coating. The wafer is then subjected to an etching solution to etch away the exposed portions of the monocrystalline semiconductor wafer leaving the embossed shape of the resistance element 32 on the surface. The thickness or height of the resistance element 32 can be controlled by varying the time of exposure to the etching solution.

A relatively thick layer 34 of insulating material, preferably of glass, having a thermal coefficient of expansion matching the thermal coefficient of the semiconductor material of wafer 30, is then applied over the embossed resistance element 32 as illustrated in FIG. 3B. Glass layer 34 can be applied by sputter techniques, by sedimentation techniques as disclosed in U.S. Patent 3,212,-921, or by fusing a plate or wafer of glass over wafer 30 by heat and pressure or by other suitable techniques. The bulk of the wafer material of wafer 30 is then removed to the planar interface of the wafer 30 and layer of insulating material 34, as illustrated in FIG. 3C. This removal of wafer material can be accomplished by chemical etching, mechanical lapping, or electrochemical polishing, which techniques are well known and will not be described. Electrical terminals or contacts are then applied to the end portions of the semiconductor element 32. This can be conveniently accomplished by evaporating or sputtering a suitable metal to the contact area through a mask. Metal for the terminal leads is preferably high temperature alloys compatible with the semiconductor element used. In the case of silicon high temperature alloys of rhodium are preferred.

In producing the temperature sensor 20, the method previously described is somewhat modified. After the resistance element 32 is formed on wafer 30, as illustrated in FIG. 3A, a coating or film of insulating material is applied over the surface thereof. The insulating coating can be any suitable material such as $SiO_2$, $SiO$, $Al_2O_3$, $Si_3N_4$, $SiC$ and the like. The insulating coating can be applied by thermal oxidation, sputtering, or the like and is relatively thin. Layer 34 is preferably a layer of polycrystalline silicon which can be conveniently applied by vapor growth techniques. Vapor growth techniques are known in the art and will not be described in detail. The semiconductor wafer 30 is then removed as described previously and terminal contacts are applied.

Figure 4:
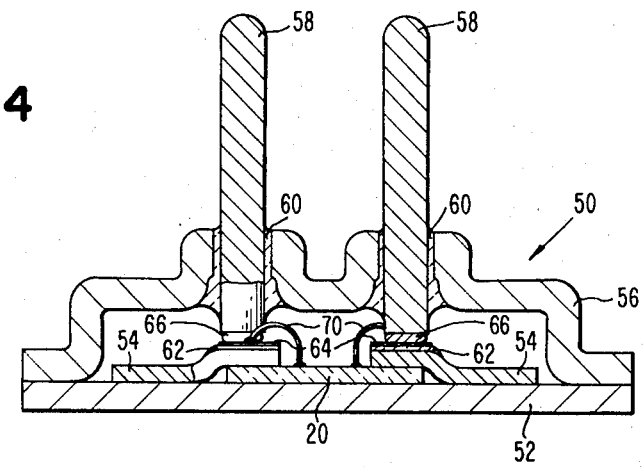
FIG. 4 is a view in vertical cross section illustrating a preferred structure of a housing device for mounting the transducer of the invention.

Referring now to FIG. 4, there is depicted a sensor subassembly housing 50 for operatively mounting the temperature sensor of the invention. The housing 50 has a base plate 52 having mounted thereon two spaced brackets 54. The semiconductor temperature sensor, either 10 or 20 described previously, is slideably secured to base plate 52 by brackets 54. Sensor 20 is positioned on base 52 with the terminal side facing upwardly. A housing 56 is secured to base plate. Two contact pins 58 are mounted in housing 56 and insulated therefrom by glass seals 60. An insulating coating 62 is disposed over the inwardly projecting portions of bracket 54, which insulating coating is preferably boron nitride. An evaporated metal contact 64 is disposed over insulating coating 62. An alloy bond 66 electrically connects the metal contact 64 to contact pins 58. Each of flexible cables 70 is electrically connected to a terminal portion of the temperature sensor at one end, and at the other end to alloy bond 66. As will be appreciated, the temperature sensor is firmly mounted in the sub-assembly housing 50, but yet is free to slide to avoid buildup of stresses produced by expansion and contraction of the base and the housing due to temperature variations. The housing and plate are preferably made of an alloy made of Kovar which consists of 29% Ni, 17% Co and 54% Fe.

Figure 5:
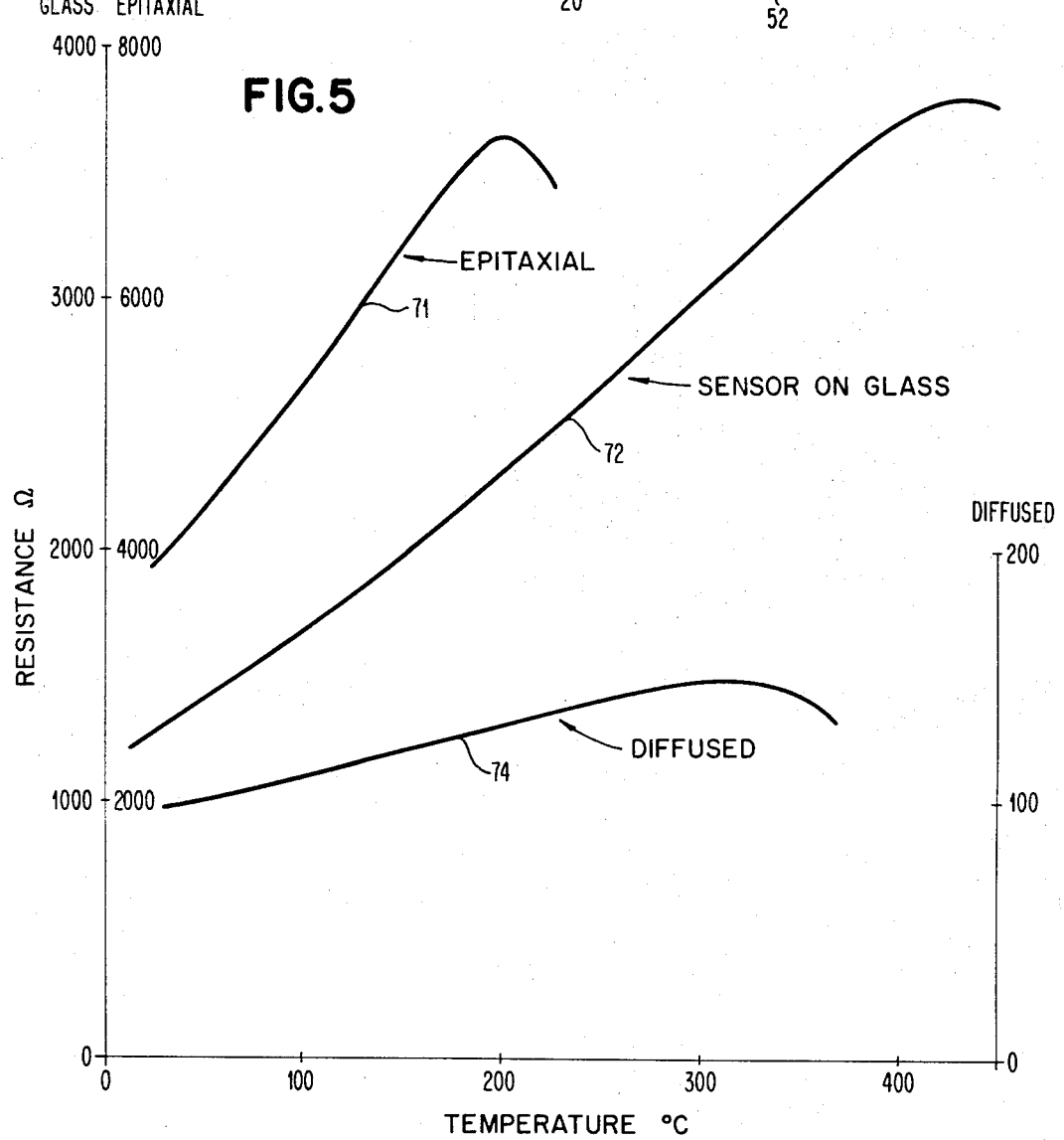
FIG. 5 is a graphic representation comparing the operating characteristics and ranges of various types of semiconductor temperature sensors.

In order to illustrate the significance in semiconductor temperature sensors of a P-N junction, three different types of devices were made and tested and the results graphically illustrated in FIG. 5 of the drawings. A first semiconductor temperature sensor was made by growing an epitaxial layer of silicon on a monocrystalline semiconductor wafer which epitaxial layer had a doping level of $5 \times 10^{17}$ atoms/cc. of P-type impurity. Curve 71 sets forth the resistance and temperature relationship of the sensor. A second semiconductor temperature sensor was produced by diffusing a resistor in a silicon monocrystalline wafer. The diffused doping level at the interface was $6 \times 10^{18}$ atoms/cc. of N-type impurity. Curve 74 sets forth the resistance and temperature relationship of this sensor. In each of the aforementioned semiconductor sensors there existed a P-N junction which insulated the resistor element from the mounting base which was a monocrystalline silicon wafer. The aforementioned semiconductor temperature sensors were compared with a preferred specific embodiment of the temperature sensor of the invention. The temperature sensor of the invention had a resistance element of monocrystalline semiconductor material inlaid in a glass base. The sensor of the invention did not have a P-N junction. The resistance element was doped with a P-type impurity to a concentration of $5 \times 10^{17}$ atoms/cc. Curve 72 sets forth the resistance and temperature relationship of the preferred embodiment of the temperature sensor of the invention. As indicated in FIG. 5, the temperature sensor of the invention has a materially larger useful operating range, as evident by the long substantially straight line portion of the curve. The curve 72, for the temperature sensor of the invention has a significantly higher upper limit temperature maximum than the sensors having P-N junctions. The magnitude of the operating range can be increased by doping to a higher level. However, when the doping concentration is increased, the sensitivity is decreased. The selection of the doping concentration is based on the sensitivity and temperature range requirements of the temperature determining or sensing apparatus under consideration. We have found that a sensor element having a boron doping concentration of $5 \times 10^{17}$ atoms/cc. in silicon has an operating range of 200° F. to 800° F. Sensor elements having boron doping concentrations of $1.5 \times 10^{16}$ atoms/cc. and $1.5 \times 10^{15}$ atoms/cc. in silicon having operating ranges of 0° F. to 500° F. and −200° F. to +100° F., respectively. As curves 71 and 74 indicate, semiconductor temperature sensors of the type described, having the resistance element insulated from the base or support by a P-N junction have a relatively lower upper working temperature level. This relatively lower upper level is attributed to leakage across the P-N junction at higher temperatures. The larger operating range of the temperature sensor of the invention is attributed to an absence of a P-N junction.

While the invention has been particularly shown and described with reference to preferred embodiments thereof, it will be understood by those skilled in the art that various changes in form and detail may be made therein without departing from the spirit and scope of the invention.

What is claimed is:

1. An electrical temperature transducer comprising,
   a base of rigid insulating material, a thin unitary elongated resistance element of monocrystalline semiconductor material embodying a dopant material substantially throughout, said resistance element being inlaid in said base and electrically insulated by said insulating material which is in intimate contact with said element, and
   spaced electrical terminals providing electrical connections to said resistance element.

2. The electrical temperature transducer of claim 1 wherein said semiconductor material of said resistance element is monocrystalline in form and has embodied therein a dopant material in a concentration in the range of $5 \times 10^{14}$ to $5 \times 10^{17}$ atoms/cc.

3. The electrical temperature transducer of claim 1 wherein said rigid insulating polycrystalline material of said base is glass material with a coefficient of expansion substantially matching the coefficient of expansion of said semiconductor material of said resistance element.

4. The electrical temperature transducer of claim 3 wherein said monocrystalline semiconductor material of said resistance element is silicon doped with a P-type impurity material to a concentration in the range of $5 \times 10^{14}$ to $5 \times 10^{17}$ atoms/cc.

5. The electrical temperature transducer of claim 3 wherein said monocrystalline semiconductor material of said resistance element is silicon having a P-type dopant embodied therein in a concentration of approximately $5 \times 10^{17}$ atoms/cc. resulting in a sensitivity on the order of 4 to 4.5 ohms per ° F.

6. The electrical temperature transducer of claim 1 wherein said resistance element has a thin insulating film formed thereon.

7. The electrical temperature transducer of claim 6 wherein said insulating film is a material selected from the group consisting of $SiO_2$, $SiO$, $Al_2O_3$, $Si_3N_4$, $SiC$, and mixtures thereof.

8. The electrical temperature transducer of claim 6 wherein said polycrystalline material of said base is silicon.

References Cited

UNITED STATES PATENTS 3,181,097  4/1965  Lehovec _____ 338—22

OTHER REFERENCES

Stern: Planer Scanistor Arrays, IBM Technical Disclosure Bulletin, vol. 7, No. 11, Apr. 1965, pp. 1101–1102.

Gardner: Semiconductor Temperature Sensor, IBM Technical Disclosure Bulletin, vol. 8, No. 3, Aug. 1965, pp. 458–459.

LEWIS H. MYERS, *Primary Examiner.*

D. A. TONE, *Assistant Examiner.*